J. H. LORIMER.
APPARATUS FOR TREATING AIR WITH LIQUIDS.
APPLICATION FILED JULY 9, 1914.
1,253,401.
Patented Jan. 15, 1918.
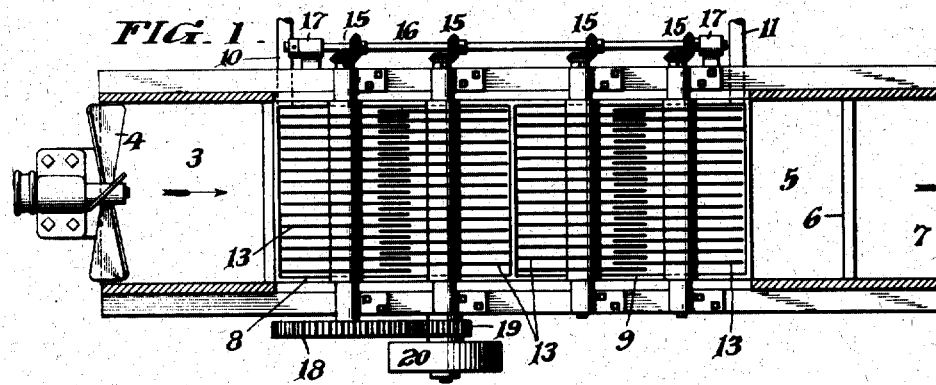
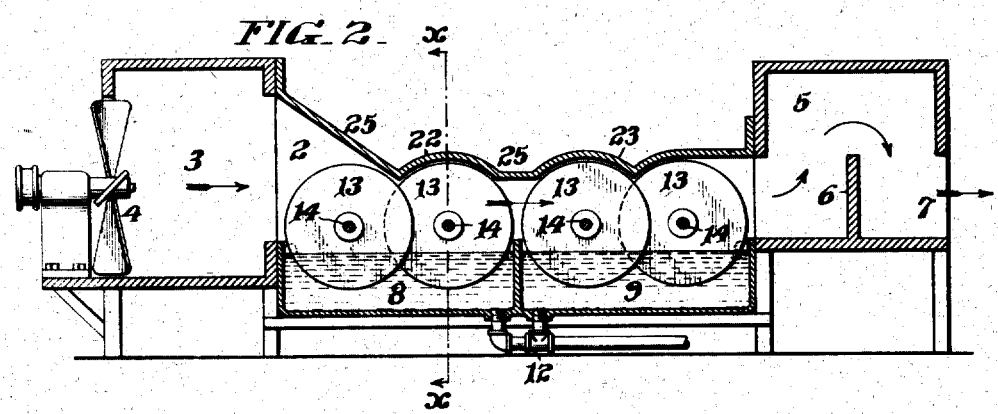
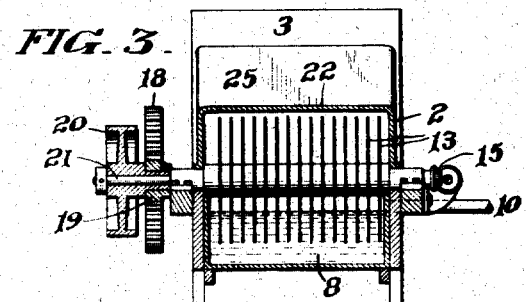
Witnesses
Daniel Webster Jr.
William Conway
Inventor
John H. Lorimer
By
Attorney

UNITED STATES PATENT OFFICE.

JOHN H. LORIMER, OF PHILADELPHIA, PENNSYLVANIA.

APPARATUS FOR TREATING AIR WITH LIQUIDS.

1,253,401. Specification of Letters Patent. Patented Jan. 15, 1918.

Application filed July 9, 1914. Serial No. 849,982.

*To all whom it may concern:*

Be it known that I, JOHN H. LORIMER, citizen of the United States, and resident of Philadelphia, county of Philadelphia, and State of Pennsylvania, have invented an Improvement in Apparatus for Treating Air with Liquids, of which the following is a specification.

The object of my invention is to provide a simple and inexpensive apparatus with which air may be treated to the action of liquids in an effective and economical manner, such operations being useful in humidifying air in textile mills or for buildings generally, for cooling air in summer and warming it in winter, for removing noxious or poisonous gases from air or neutralizing them for collecting perfumes, for collecting nicotin in tobacco treatments, concentrating soda and other liquors from mercerizing and other processes and for many other uses in the industrial arts where air, pure or laden with gases, is required to be modified.

My invention consists of a conduit structure through which air is circulated by a suitable blower or exhauster, and in association with which conduit is arranged one or more tanks for containing the liquid to be used in treating the air and one or more sets of rotatable disks partly submerged in the liquid of the tank or tanks, and their exposed surfaces being in the plane of the flow of air currents and preferably overlapping each other to provide variations in the air passage or conduit which insures suitable disturbance of the air during its passage between the disks and thereby insure all portions of the air being fully subjected to the action of the moisture on the disks.

My invention further consists in having the conduit structure above the disks made in a more or less sinuous or irregular form to provide deflecting parts to direct the air downward upon the main body of the exposed portions of the disks and thereby insure all portions of the air receiving the same general treatment.

My invention also comprehends details of construction which, together with the features above specified, will be better understood by reference to the drawings, in which:—

Figure 1 is a sectional plan view of a machine embodying my invention; Fig. 2 is a sectional side elevation of the same; and Fig. 8 is a transverse sectional view of the same on line $x$—$x$.

2 is a conduit having at its lower portion the tanks 8 and 9 which are provided with pipes 10 and 11 for supplying liquid to them and with pipes 12 for draining them when desired. These pipes may be arranged in any suitable way desired. This conduit opens at one end into the blast chamber 3 into which air is forced by the blower or fan 4, the said chamber acting as a pressure chamber for insuring a more uniform flow of air through the conduit. The other end of the conduit 2 opens into the discharge chamber 5 from which the treated air may escape through an opening 7. This chamber 5 may be provided with a baffle 6 of any suitable construction and its function may be twofold, viz., to maintain a slight back pressure on the air to insure more intimate contact with the moisture on the disks (to be described), and to cause a precipitation of any excessive quantities of suspended moisture carried off with the air.

Arranged in the conduit and rotating, partly submerged in the liquid contained in the tanks 8 and 9, are the several series of disks 13. As shown, there are a series of transverse shafts upon each of which there are arranged a plurality of disks of metal or other suitable material, said shafts being suitably journaled in bearings and connected to rotate, preferably in the same direction, by a connecting shaft 16 and bevel gears 15. The disk 13 of one shaft 14 may be staggered with the disks of the next adjacent shaft and overlap so that they provide contracted passages at intervals in the conduit by reducing the space for air between the disks. I have shown four sets of disks arranged in two overlapping pairs, but it will be understood that there may be as many sets of disks employed as desired, and all of them may overlap adjacent disks where only one liquid is employed. In the particular illustration of my invention here given, I employ two tanks and two sets of disks, one for each tank so that two different kinds of liquids may be employed for treating the same current air, thus the liquid employed in tank 8 may be of a different character than that employed in tank 9. For instance, if the air contained acid gases it may be neutralized by an alkaline solution in tank 8, or vice versa, and the resulting air subjected to a washing treatment by the water of tank 9.

To insure the air being thoroughly brought into contact with the moisture on the disks, I form the top of the conduit 2 in more or less sinuous form as indicated at 22. This provides the downwardly inclined portions 23 at the discharge side of each set of disks 13 to deflect the air in a downward direction between the disks and prevent its flowing above the disks where it would not be properly treated to the moisture. I do not restrict myself to any particular way of securing this deflecting result, as these deflecting parts 23 may be provided within the conduit in any manner desired.

The shaft 16 may be directly rotated, but I have shown a simple and satisfactory manner of securing rotation to the disks. One of the shafts 14 is provided on its end with a gear wheel 18 and this is driven by a pinion 19 fastened to a band wheel 20, the latter journaled upon an extension 21 of the next adjacent shaft 14. In this manner, the band wheel and pinion are given an inexpensive support and all of the disks are rotated at a reasonably slow speed.

In the operation of this machine, the disks are constantly presenting freshly moistened surfaces to the constantly flowing air put into circulation by the fan or blower, and as the disks are relatively closely arranged side by side, the air is subdivided or sliced into layers and each subjected to the action of the moisture on the disks; and upon passing to successive parts of disks the sliced air is mixed and resliced and again treated so that a most thorough contact of air and liquid results. Moreover, the air may be subjected to variations in pressure during its treatment to the liquid and in this way insure better contact.

I have shown my apparatus in the form I have found satisfactory for commercial use and while I prefer the general arrangement and construction of the parts, I do not restrict myself to the details, as these may be modified without departing from the spirit of the invention.

Having now described my invention, what I claim as new and desire to secure by Letters Patent, is:—

1. In apparatus for treating air, a conduit having a tank for containing liquid at its lower part and deflecting means at its upper part extending obliquely downward and backward, combined with means for circulating air through the conduit, a plurality of disks arranged parallel to each other upon a shaft and having their upper portions rotating in the conduit above the tank and their lower portions rotating in the liquid in the tank the planes of said disks arranged in the direction of the flow of the air and upper rear curved edges of the disks closely fitting the deflecting means of the conduit, and means to rotate the shaft carrying the disks.

2. In apparatus for treating air, the combination of a conduit having a tank at its lower part for containing liquid, means for causing a movement of air through said conduit, and a plurality of sets of rotating disks, arranged in pairs in substantially the same horizontal plane, the disks of one set being staggered with and overlapping the disks of the next adjacent set and said disks partly submerged in the liquid of the tank and partly fitting the conduit above the tank and between which the air is forced, and means for rotating said disks.

3. In apparatus for treating air, the combination of a conduit having a tank at its lower part for containing liquid and deflecting means at its upper part extending obliquely downward and backward, means for causing a movement of air through said conduit, means to produce a back pressure by retarding the escape of the air from the conduit, and a plurality of sets of rotating disks arranged in pairs in substantially the same horizontal plane, the disks of one set being staggered with and overlapping the disks of the next adjacent set and said disks partly submerged in the liquid of the tank and partly fitting the conduit above the tank up to the deflecting means thereof and between which disks the air is caused to flow, and means for rotating said disks.

4. In means for treating air, the combination of a conduit having a tank structure at its lower part for containing liquid, means for circulating air through the conduit, a plurality of transverse shafts above the tank geared together to simultaneously rotate, and a plurality of parallel disks secured upon each shaft revolving partly in the liquid of the tank structure and partly in the conduit above the tank, the plane of the disks being in the direction of the air currents and the disks of one shaft being staggered and overlapping the disks of the next adjacent shaft, and means for rotating the shafts and disks.

In testimony of which invention, I hereunto set my hand.

JOHN H. LORIMER.

Witnesses:
R. M. HUNTER,
FLORENCE DEACON.